United States Patent [19]
Morosini

[11] Patent Number: 5,134,914
[45] Date of Patent: Aug. 4, 1992

[54] APPARATUS FOR DISENGAGING A SECTION CUT TO LENGTH ON A POWER SAW

[76] Inventor: Flavio Morosini, 18, rue du Rouvion, F-54800 Hatrize, France

[21] Appl. No.: 613,839

[22] Filed: Nov. 30, 1990

Related U.S. Application Data

[63] Continuation-in-part of PCT/FR90/00069, Jan. 29, 1990.

[30] Foreign Application Priority Data

Jan. 30, 1989 [FR] France ................... 89 01111

[51] Int. Cl.$^5$ ..................... B23D 47/04; B23Q 7/00
[52] U.S. Cl. ............................. 83/395; 83/81; 83/102; 83/119; 83/159; 83/490; 83/468.6; 83/468.7; 83/471.2
[58] Field of Search ............ 83/81, 82, 102, 113, 83/119, 120, 159, 380, 394, 395, 396, 468.6, 471.2, 490, 468.2, 468.7

[56] References Cited

U.S. PATENT DOCUMENTS

| | | | |
|---|---|---|---|
| 1,830,760 | 11/1931 | Johnsen | 83/81 |
| 2,742,935 | 4/1956 | Acton | 83/82 |
| 3,136,071 | 6/1964 | Hill | 83/468.6 |
| 3,550,653 | 12/1970 | Gauthier et al. | 83/203 |
| 3,759,124 | 9/1973 | Basher | 83/471.2 X |
| 3,862,583 | 1/1975 | Tsuchiya | 83/796 |

FOREIGN PATENT DOCUMENTS 3542605 6/1986 Fed. Rep. of Germany.

Primary Examiner—Frank T. Yost
Assistant Examiner—Raymond D. Woods
Attorney, Agent, or Firm—Horst M. Kasper

[57] ABSTRACT

An elongated piece to be cut is clamped in a vise (9) and is in abutment against a stop (10), the stop (10) being secured on a shaft (11) free to rotate in bearings. The shaft is connected to a connecting rod (19) and a rod (20) of adjustable length to an arm (4) which carries the sawing blade (6), whereby, as the cutting operation is carried out, the stop (10) rises while pivoting and loses contact with the piece being cut before the cutting operation is finished.

20 Claims, 4 Drawing Sheets

APPARATUS FOR DISENGAGING A SECTION CUT TO LENGTH ON A POWER SAW

CROSS REFERENCE TO RELATED APPLICATIONS

This application is a continuation-in-part application of another international application filed under the Patent Cooperation Treaty on Jan. 29, 1990, bearing Application No. PCT/FR90/00069, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The present invention relates to an apparatus which can be attached to a power saw, or which can be incorporated into a power saw during its assembly, in order to disengage and separate an end section of an elongated piece cut by this saw at a length wherein the length is controlled by the positioning of a stop which previously supported this elongated piece.

2. Brief Description of the Background of the Invention Including Prior Art

During sawing operations the danger exists that the cut-off piece is carried along by the moving saw blade and possibly jams. The presence of a stop generally does not provide protection against such motion.

A displaceable stop is moved by sliding or gliding in the direction of removal or of approach of the plane of the saw blade on the saw power source to which the invention applies. Frequently, the stop is moved in a graduated fashion, and is solidly blocked in its position when it is removed from the saw blade by a desired distance.

This stop remains blocked in this position during the execution of the whole saw operation. At the start of this operation, an end section between the stop and the saw blade is still strongly connected to the rest of the elongated piece which is solidly fixed, in most cases in a vise. As the sawing process progresses, the end section is less and less well held in place by the part of the diminishing section which connects the end section to the elongated piece. At the same time, the end section is restrained without play in a longitudinal direction between a side face of the saw blade and the face of the stop against which the elongated piece is supported. The friction, which is inevitably generated between the saw blade and the end section in the course of the sawing operation, results in the consequence that a transverse force is applied to the transverse end of the end section which is in contact with the saw blade. Toward the end of the sawing operation, this transverse force becomes sufficiently strong to overcome the resistance of the part of the diminishing section which remains to be sawn. It happens frequently that the end section is brutally and forcefully pulled from the elongated piece due to the forced rupture of the part which remains to be sawn. Sometimes, the end section can be projected and can hurt a person. Sometimes the end section can assume a canted position and can be jammed between the stop and the saw blade. Such jamming generates a risk of damaging the saw blade. In many cases, the sawn end section is simply displaced relative to its initial position before the sawing process but its final position cannot be predicted. This is disadvantageous to the installation and to the proper functioning of an automatic apparatus for successive removal of each sawn end section because such apparatus requires that the sawn end section assume at all times a precise and a predetermined position.

SUMMARY OF THE INVENTION

Purpose of the Invention

It is an object of the invention to provide an apparatus which eliminates the risk that an end section, sawn to a length defined by a stop, is carried by the saw blade in a transverse direction.

It is another object of the invention to suppress a risk of a sawn-off end section to be projected or of an end section to be jammed, or, even of a displacement of the sawn-off end section to a position which is somehow dangerous.

It is a further object of the invention, and a direct consequence of the first object of the invention to combine and/or attach an additional apparatus which is capable of removing the sawn end section in an automatic fashion at the end of the sawing operation, with a main sawing apparatus such as recited above.

Brief Description of the Invention

According to the invention, an apparatus for removing a section cut to length from an elongated piece on a sawing machine comprises a saw blade. The saw blade is mounted on a stand. A vise is mounted on the stand for holding an elongated piece. A movable member is displaceably mounted on this stand and carries the saw blade for performing a sawing operation advancing along a plane disposed perpendicular to the elongated piece held in the vise. Bearings are attached to the stand. A frame element is held in part in the bearings. A stop is movably mounted on the frame element and position-controllable on this frame element at a side opposite to the vise relative to a position of the saw blade for guiding said frame element pivotingly around an axis disposed perpendicular relative to said perpendicular plane. Kinematic connection means tie the movable member carrying the saw blade to the frame element carrying the stop. Said kinematic connection means generate a pivoting of this frame element and of the stop progressively starting from an initial position of said stop. The stop is sufficiently removed from its initial position during each sawing operation and before the end of the operation such that the stop no longer remains in contact with any end section being cut and this section is removed from all contact with the stop.

A motor can be linked to the saw b lade for rotating the saw blade.

The kinematic connection means can be of a mechanical type. The kinematic connection means can comprise at least one connection rod hinged by a first end at the movable member carrying the saw blade and hinged at a second end at the frame element carrying the stop.

The connection rod can be hinged at the movable member carrying the saw blade by way of a rod of adjustable length. This rod of adjustable length can have a first end which is hinged to a first end of the connection rod. This rod of adjustable length can have a second end by which it is fixed to a piece of the movable member. In this way, the movable member can move simultaneously with the rod of adjustable length.

The apparatus can comprise an additional arbor and a support table for a section to be cut from an elongated piece. At least one part of the said support table can be movably mounted allowing rotation around a geometric axis. This geometric axis can be an axis of the additional arbor supported parallel to said pivoting axis in the bearings fixed to the stand. The movable member can be fixed to the additional arbor during a rotation of the support table. A control member can be disposed on the stand. The movable member can be functionally fastened to the control member in order to be moved by the movable member carrying the saw blade at the time of an end of the sawing course after execution of the sawing operation. The apparatus can comprise a restoring spring. The control member can push against a part attached to the support table to furnish a removing and clearing position for a section separated from the elongated piece against the effect of the restoring spring of this part attached to the support table relative to its initial position. The support table can be movably mounted around the geometric axis of the additional arbor. The said part attached to the support table can be fixed to an additional arbor. The additional arbor can be mounted to allow free rotation in its bearings.

The control member can be coupled to the connection rod by the intermediary of a coupler disengaged during the execution of the sawing operation, and engaged after the sawing operation.

The apparatus can comprise a radial arm disposed at the additional arbor. A push rod can be slidingly mounted on the stand and rest on this radial arm. The push rod can be actuated and engaged against the operation of the restoring spring by the movable member carrying the saw blade after the execution of the sawing operation.

An apparatus for disenagaging a sawn end section from an elongated piece on a sawing machine comprises a stand. A vise mounted onto the stand retains an elongated piece. A movable member, displaceably mounted on the stand, performs a sawing course in a transverse plane relative to an elongated piece held in the vise. A saw blade, mounted on this movable member, is driven by a motor. A stop is movably mounted on a frame element and is adjustable in position on this frame element opposite to the vice in relation to the saw blade. The invention device comprises bearings fixed to the frame and partially contains said element carrying the movable stop for guiding the movable stop pivotingly around an axis perpendicular to said transverse plane. Kinematic connection means link the member carrying the saw blade with the element carrying the stop. These connection means generate the pivoting motion of this element and of the stop progressively from an initial position of this latter element during each sawing operation such that the stop is sufficiently removed from its initial position prior to the end of the sawing operation, in order to be no longer in contact with any end section being sawn and to disengage this end section from any contact with the stop.

The type of the saw to which the invention can be applied is not limited by the type of power saw. It can be any saw, for example, a rectilinear blade saw, a continuous blade saw, a disk blade saw, or also a grinding-disk saw cutting by abrasion. Nevertheless, the most frequently used saws with which the invention is concerned are the toothed disk blade saws which are frequently employed on construction sites and which are, therefore, often called construction saws. In the following, all the recited cutting devices will be designated as saw blades.

In the case of kinematic connection means of a mechanical type, these means preferably comprise at least one rod, hinged on the one hand, by a first end with a movable member carrying the saw blade, and on the other hand, by a second end with the element carrying the stop.

Advantageously, the rod is hinged with the movable member carrying the saw blade by means of a shaft of adjustable length. A first end of the shaft is hinged with the first end of the rod. A second end of the shaft, fixed to a part of the movable member, can be displaced at the same time as the movable member.

According to a particular embodiment of the invention, there is added to the above described apparatus a device which comprises moreover an additional arbor supported in parallel to the pivoting axis of the bearings disposed at the stand. At least one part of a support table is movably mounted to allow rotation around the geometric axis of said additional arbor and which is functionally linked to a control member disposed on the stand in order to be engaged or activated by the member carrying the saw blade at the end of the sawing course after the execution of the sawing operation. This control member thus pushes the part of the support table up to a removal position of one end section separated from the elongated piece, against the effect of a restoring spring of this part of the table to its initial position.

According to an examplified embodiment of the invention, the structure of the support table is mounted movable around the geometric axis of said axle.

According to a further embodiment of the invention, the arbor is furnished with a radial arm and a push rod is slidably mounted on the stand in order to rest on this radial arm. The push rod is moved against the effect of the restoring spring by the movable member carrying the saw blade after the finishing of the sawing operation.

According to a further embodiment of the invention, the control member is linked to the rod by means of a coupler, disengaged during the execution of the cutting operation, and engaged after the cutting operation.

The nature of the processable elongated pieces is not limited by the invention. They can be metallic pieces such as cylindrical bars, they can be round or square wooden posts, or they can be any other elongated piece.

The invention is particularly useful where its purpose is to cut, with the aid of a saw blade mounted on a mobile member displacing this saw blade in the cutting direction, a section of an elongated piece, where the length of the section to be cut is determined with the aid of a stop against which rests a free end face of the said elongated piece before and during the cutting operation.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
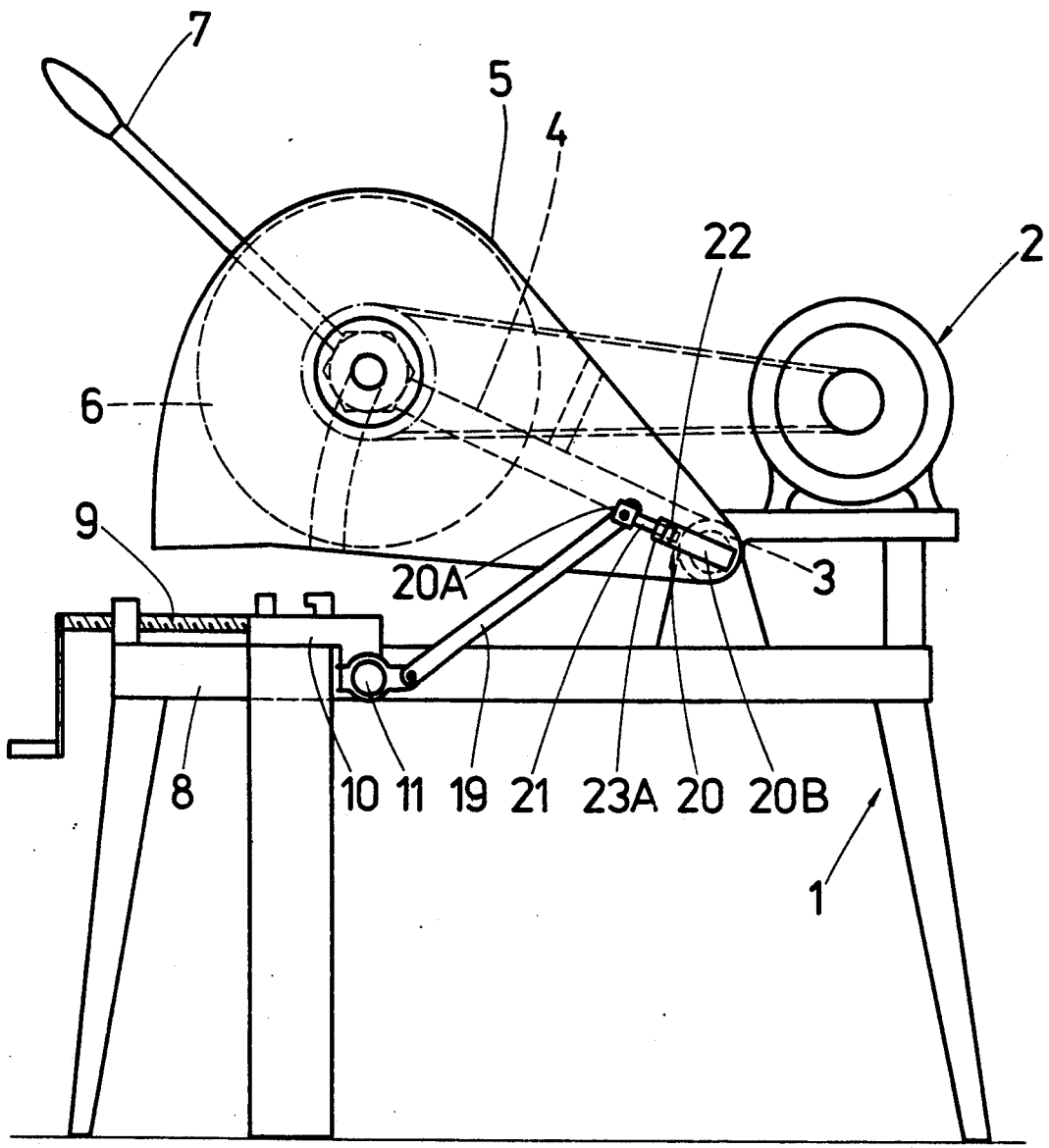
FIG. 1 is a side view of a construction saw equipped with a device according to the invention.

According to the present invention, there is provided for an apparatus for removing a section cut from an elongated piece on a sawing machine. A vise 9 is mounted on a stand 1 for holding an elongated piece. A movable member 4 is diplaceably mounted on this stand 1 for the performance of a sawing course in a transverse plane to an elongated piece held in the vise 9. A saw blade 6 is mounted on this movable member represented by an arm 4 and is driven along by a motor. A stop 10 is movably mounted on a frame element 15 and position-controllable on this frame element furnished by the cylindrical arbor 15 at the opposite side of the vise 9 relative to the saw blade 6. Bearings 17A, 17B are attached to the stand 1 and in part hold the said frame element 15 carrying the movable stop 10 for guiding said frame element 15 pivotingly around an axis perpendicular to that said transverse plane. Kinematic connection means 19, 20 including connecting rod 19 and rod 20 connect and tie the movable member 4 carrying the saw blade 6 to the frame element 15 carrying the stop 10. These kinematic connection means 19, 20 generate the pivoting of this frame element 15 and of the stop 10 progressively starting with an initial position of this stop 10, during each sawing operation such that, before the end of the operation, the stop 10 is sufficiently removed from its initial position in order to be no longer in contact with any section being cut and to disengage this section from all contact with the stop 10.

The kinematic connection means can be of a mechanical type and can be in particular a connecting rod 19. These kinematic connection means comprise at least one connecting rod 19 hinged, on the one hand, by a first end with the movable member 4 carrying the saw blade 6, and, on the other hand, by a second end with the frame element 15 carrying the stop 10.

The connecting rod 19 can be hinged with the movable member 4 carrying the saw blade 6 by means of a rod 20 of an adjustable length. The rod 20 can have a first end 20A which is hinged to the first end of the connection rod 19. The rod 20 can have a second end 20B by which it can be fixed to a piece of the movable member 4, such that the movable member 4 can be displaceable at the same time as the rod 20.

The apparatus can comprise a support table 8 for a section to be cut from an elongated piece. At least one part of the said support table 8 can be movably mounted allowing rotation around a geometric axis. This geometric axis can be the axis of an additional arbor 23 supported parallel to said pivoting axis in the bearings 24A, 24B fixed to the stand 1. The movable part can be fixed to this additional cylindrical arbor 23 during a rotation of the support table 8. The movable part can be functionally fastened to a control member 26 disposed on the stand 1 in order to be actuated by the movable member 4 carrying the saw blade 6 at the end of the sawing course after execution of the sawing operation. This control member 26 can push against the cross bar 8A of the support table 8 up to a removal and clearing position of a section separated from the elongated piece against the effect of restoring spring 31 of this part of the table to its initial position. The totality of the support table 8 can be movably mounted around the geometric axis of the additional arbor 23. The cross bar 8A of the support table 8 can be fixed to this additional arbor 23. The additional arbor 23 can be mounted to allow a free rotation in its bearings 24A, 24B. The control member 26 can be coupled to the connecting rod 19 by means of a coupler 34, disengaged during the execution of the sawing operation, and engaged after the sawing operation. The additional arbor 23 can be furnished with a radial arm 29. A push rod 27 can be slidingly mounted in a bearing 23B on the stand 1 to rest on this radial arm 29. The push rod 27 can be actuated and engaged against the effect of a spring 31 by the movable member 4 carrying the saw blade 6 after the execution of the sawing operation.

FIG. 1 is a simplified schematic representation of a construction saw including conventional elements and such elements consequently do not have to be described in detail. This construction saw comprises a stand 1 which carries a motor 2 as well as an arbor 3, supported by the stand 1, in order to be able to pivot at the same time as an arm 4, which is fixed by one end to this arbor 3. The other end of the arm 4, at the interior of a protection sheet guard 5, there is mounted a saw blade 6. In this example, the saw blade is furnished by a circular disk furnished with teeth at its periphery. The arm 4 is easily controllable and movable by hand with the aid of a lever 7 along a sawing course, for performing a sawing operation, between one upper position, as shown in FIG. 1, and a lower position, where the saw blade 6 has terminated the performing of one sawing operation. The motor 2 engages this saw blade 6 in rotation during the sawing operation. The arm 4 is a movable member which allows the performance of a sawing operation.

On the support table 8, on one side of the saw blade, there is installed a hand vise 9, and on the side opposite to the saw blade 6, there is installed a movable stop 10.

The stop 10 is movable by sliding or gliding along an element 11 of the stand 1 on a conventional construction saw. This element 11 is, for example, an arbor fixed in position on which the stop 10 can be blocked at any desired position which defines together with the saw blade 6 the length of the end section to be cut in an elongated piece clamped in the vise 9.

Figure 2:
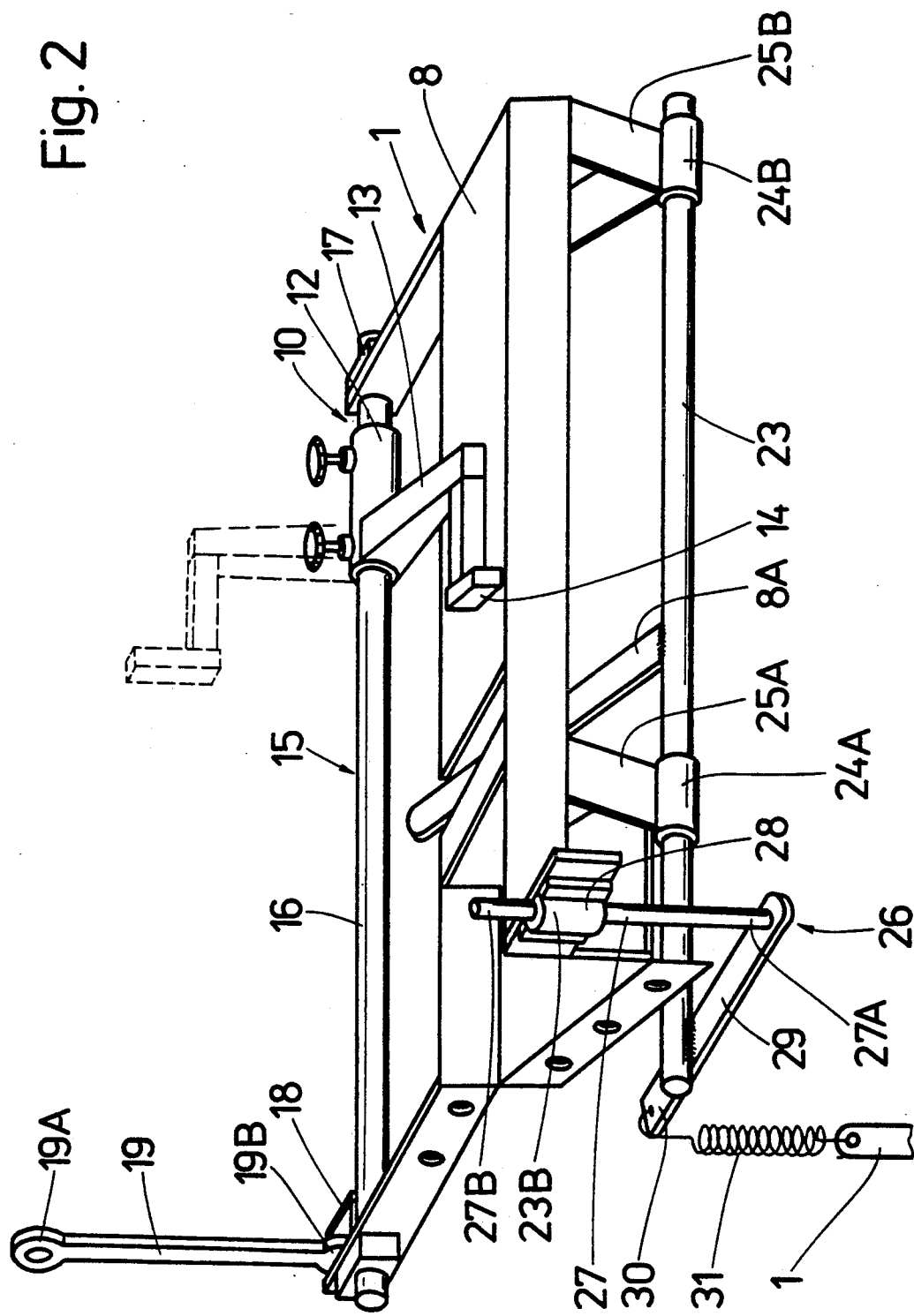
FIG. 2 is a perspective view of the invention device which is arranged at the cutting saw of FIG. 1.

Reference is now made to FIGS. 1 and 2 and, in particular, to FIG. 2 which shows the invention device which equips the construction saw described above. FIG. 2 shows only the part of the stand which is necessary for the description of the invention apparatus. The movable stop 10 comprises a hub 12. A transversal arm 13, ending in a support face 14 parallel to a plane containing the saw blade 6, projects and extends laterally from the hub 12. The hub 12 is mounted in order to be able to slide along a cylindrical arbor 15 which replaces the conventional fixed element 11 mentioned above. This arbor 15 carries a scale 16 and is movably mounted for rotation around its geometrical longitudinal axis in bearings 17A, 17B. The bearings 17, 17A, 17B are part of the stand 1. After the displacement of the stop 10 up to the desired position, this stop 10 is solidly immobilized and fixed in position on the arbor 15 with the aid of a screw, for example.

The arbor 15 is furnished with a cap piece 18 which extends in a radial direction at its end part close to the saw blade 6. The arbor 15 is hinged to a second end 19B of a connecting rod 19 with the aid of the cap piece 18. The first end 19A of this connecting rod 19 is hinged with a cap shaped first end 20A of a rod 20, illustrated in FIG. 1, where the length of the rod is adjustable by means of, for example, a threaded rod 21 fixed to the cap shaped first end 20A and engaged in a nut 22 accompanied by a blocking counternut 23A. The nut 22 is fixed to a second end part 20B of the rod 20. This second end part 20B is fixed to the end of the movable arm 4 associated with the arbor 3. In this manner, the hinged assembly structure, comprising the rod 20, the connecting rod 19, the arbor 15, the stop 10, is pivoted at the same time as the arm 4, carrying the saw blade 6, is pivoted. However, this assembly structure pivots in an inverse direction: when the saw blade 6 descends in the course of a sawing operation, the stop 10 rises in order to finish at an extreme upper position, as illustrated by a dot-and-dash line in FIG. 2, at the point of time where the saw blade 6 arrives at its extreme lower position after the execution of the sawing operation.

During this motion, the stop 10 progressively leaves the piece being sawn, not illustrated here, which was initially supported against its support face 14 and the stop 10 leaves the piece being sawn totally released a short time prior to the end of a sawing operation. The end section has therefore, the freedom to assume a certain amount of play relative to this saw blade 6 during the course of separation by the action of the saw blade 6. The friction against the side face of the saw blade is substantially reduced and becomes even non-existant such that the sawn-off end section does no longer risk to be carried along and displaced by the saw blade or to be jammed or wedged between this saw blade and the support face 14 of the stop 10.

The arbor 15 can be displaced in the bearings 17A and 17B in rotation around its longitudinal geometric axis. It is conceivable that this arbor 15 is retained fixed in its bearings and that the stop 10 is movable and displaceable in rotation around the arbor 15, by being locked in a translational direction. However, this realization would be more complicated and more costly without engendering any additional advantages.

Once the end section is detached by sawing from the elongated piece, there is no further risk that the end section is projected and moved by the saw blade, or that it becomes wedged or jammed between the saw blade and the support face 14 of the stop 10, or that it is carried into any risky and hazardous position on the table 8 by the action of the saw blade. It is therefore easier to add to and to retrofit the apparatus described above with an additional device for removal of the sawn-off end section.

FIG. 2 illustrates an additional arbor 23 which is mounted freely rotatable in bearings 24A, 24B suspended and supported by arms 25A, 25B fixed to the stand 1 and positioned below the table 8. This arbor 23 is disposed preferably parallel to the geometric axis around which the stop 10 is pivoted as explained above. A cross bar 8A, which is carved out of the table 8 and which extends at right angles to the additional arbor 23, is fixed to the additional arbor 23 at one end.

The cross bar 8A is functionally fastened by means of the arbor 23 to a control member, designated by reference numeral 26. This control member 26 comprises a push rod 27, disposed in the assembly perpendicular to the surface of the table 8. The push rod 27 is slidably mounted in a guide 28 fixed to the stand 1. The push rod 27 has a lower end 27A which rests on a radial arm 29 fixed to the arbor 23. Preferably, the arm 29 extends to the other side of the arbor 23 by an extension and projection 30 to which an end of a restoring spring 31 is attached The second end of the restoring spring is attached to the stand 1. The spring 31 holds in the push rod 27, the arbor 23, the cross bar 8A of the table 8, in a first position, where this cross bar 8A occupies this position prior to the performance of the sawing operation.

The push rod 27 has an upper end 27B which is located in order to be met and stricken by a point of the arm 4, while this arm 4 is at the point of arriving at the end of its course after the execution of the sawing operation. At this moment, the push rod 27 is pressed, the arbor 23 is turned, and the cross bar 8A of the table 8 is lifted. During the lifting motion, the cross bar 8A pushes the end section which has been detached by sawing beyond the table.

It is understood that there could exist several cross bars 8A, which are spaced apart along the arbor 23, are cut out of the table 8 and are brought together at the arbor 23 in order to be lifted by the arbor 23 as described above.

Figure 3:
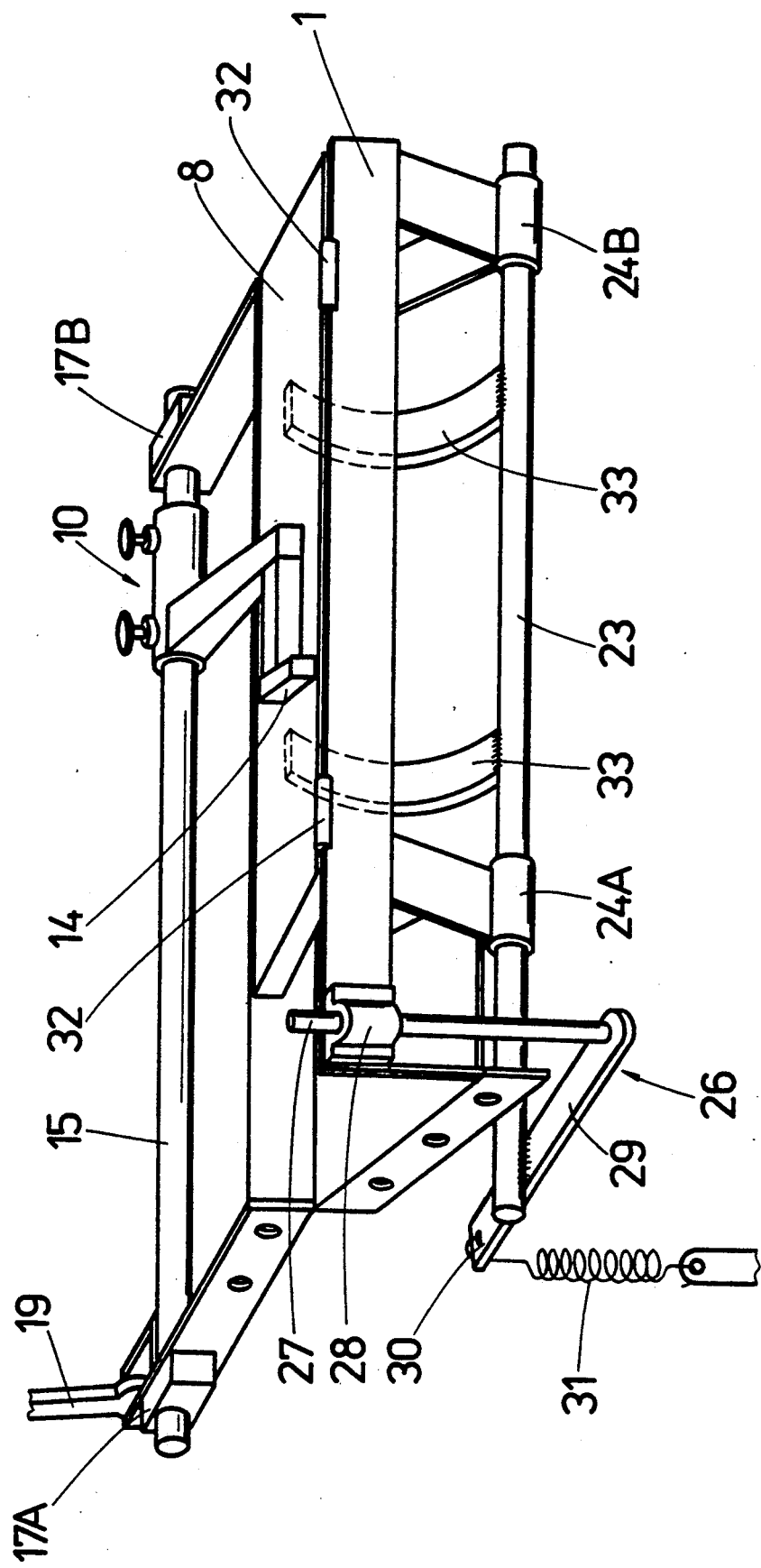
FIG. 3 is a partial perspective view similar to that of FIG. 2, showing a variation of the embodiment of the invention.

FIG. 3 shows that the assembled structure of the table 8 can be assembled with the stand 1 by way of hinges 32 in order to be lifted up in totality by the engagement of a control member 26. This raising of the totality of the table 8 is possible since at this moment the stop 10 is in its upper position, as indicated with the dash-and-dot line in FIG. 2. In this case, the lower face of the table 8 is fastened to the arbor 23 by inwardly curved arms 33.

The table 8 is illustrated in FIGS. 1 through 3 as being a plane table in order to make the drawing less complicated and easier to understand. However, for practical purposes, the table 8 can have the shape of a V with a small angle in order to serve for the centering of the end section during the separation process by sawing.

Figure 4:
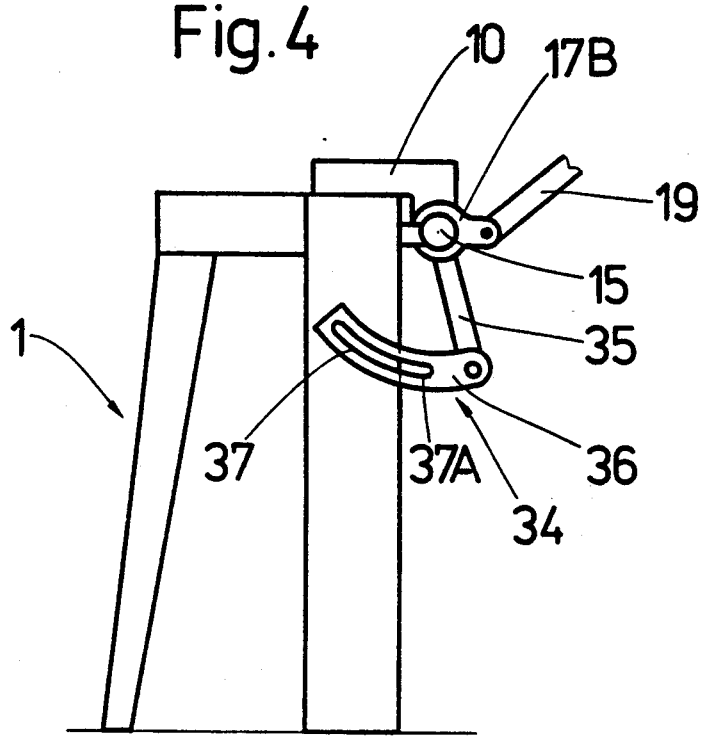
FIG. 4 is detailed view referring to a first particular embodiment of the invention.
Figure 5:
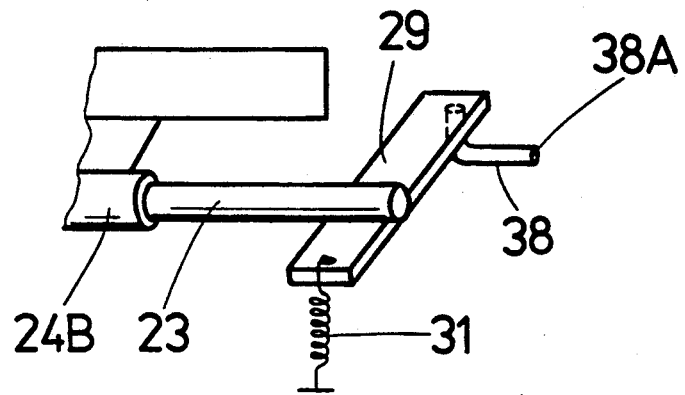
FIG. 5 is detailed view referring to a second particular embodiment of the invention

FIGS. 4 and 5 illustrate that, for the lifting of the table 8 or, at least of a part of this table 8 after the sawing operation, the control member 26 can be operated at the desired moment from the connecting rod 19 by means of a coupler 34, as illustrated in FIG. 4. Since this coupler is disengaged, it renders this connecting rod 19 inoperative on the control member 26 as long as the sawing operation is not terminated.

For this purpose, the arbor 15 extends beyond the the bearing 17B, opposite to the connecting rod 19, and it is furnished by a bar 35 which is radial in relation to this arbor 15. A flat iron 36, curved to a circular arc shape, is fixed at an end to the free end of the arbor 15. The center of the circular arc is on the geometric axis of the arbor 15. An elongated opening 37 is provided in this flat iron 36, which is also curved and centered around the same axis. An end part 38A of an arm of a bracket 38 is engaged along this curved elongated opening 37. The other arm of the bracket 38 is fixed to the end of the radial arm 29 as illustrated in FIG. 5, while a motion of the rod 27 is suppressed.

During the sawing operation and the corresponding rotation of the arbor 15, the end part 38A is disposed in the elongated opening 37 and the additional arbor 23 does not turn. When the end 37A of the opening 37 encounters and pushes the extreme end part 38A, after the end of the sawing operation, the arbor 23 turns and forces the table 8 to lift itself as described above.

The invention covers the different equivalent variations which can be applied to the described examples, in particular, to the variations realized with the aid of electrical components replacing the mechanical members. For example, the lifting of the control member 26 or of several parts of the support table 8, and even the lifting of the table 8 in its totality, can be executed by an electric solenoid or by an electric motor. The excitation of this solenoid at the desired moment can be realized by a limit switch actuated by any convenient point of the movable member or the arm 4. The push rod 27 is thereby replaced.

It will be understood that each of the elements described above, or two or more together, may also find a useful application in other types of sawing devices differing from the types described above.

While the invention has been illustrated and described as embodied in the context of an apparatus for disengaging a section cut to length on a power saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for removing a section cut to length from an elongated piece on a sawing machine comprising
    a saw blade;
    a stand for the saw blade;
    a vise mounted on the stand for holding an elongated piece;
    a movable member displaceably mounted on said stand and carrying the saw blade for performing a cutting operation advancing along a plane disposed perpendicular to the longitudinal axis of the elongated piece held in the vise;
    bearings attached to the stand;
    a frame element in part holding in the bearings;
    a stop movably mounted on the frame element and positioncontrollable on said frame element at a side opposite to the vise relative to a position of the saw blade which pivots with said frame element around an axis of said frame element disposed perpendicular relative to said plane;
    kinematic connection means for tying the movable member carrying the saw blade to the frame element carrying the stop, wherein said kinematic connection means generate a pivoting of said frame element and of the stop progressively starting from an initial position of said stop, wherein the stop is sufficiently removed from its initial position during each cutting operation and before the end of the operation such that the stop no longer remains in contact with any end section being cut and said stop is removed from all contact with the section.

2. The apparatus according to claim 1 further comprising
    a motor linked to the saw blade for rotating the saw blade.

3. The apparatus according to claim 1, wherein the kinematic connection means are of a mechanical type, wherein the kinematic connection means is hinged by a first end at the movable member carrying the saw blade and hinged at a second end at the frame element carrying the stop.

4. The apparatus according to claim 3, wherein
    a connection rod is hinged at the movable member carrying the saw blade by way of a rod of adjustable length, wherein said rod of adjustable length has a first end which is hinged to a first end of the connection rod and which rod of adjustable length has a second end by which it is fixed to a piece of the movable member and such that the movable member is movable simultaneously with the rod of adjustable length.

5. The apparatus according to claim 1 further comprising
    an additional arbor;
    a support table for a section to be cut from an elongated piece, wherein at least one part of the said support table is mounted allowing rotation around a geometric axis, and wherein said geometric axis is parallel to an axis of the additional arbor supported parallel to said axis of said frame element in the bearings fixed to the stand, and wherein the movable member effects rotation of the additional arbor and the support table;
    a control member disposed on the stand, wherein the movable member is functionally fastened to the control member in order to be moved by the movable member carrying the saw blade at the time of an end of a cutting course after execution of the cutting operation;
    a restoring spring;
    a radial arm (29) attached to the additional arbor, wherein the control member pushes against the radial arm (29) attached to the additional arbor to furnish a removing and clearing position for a section separated from the elongated piece against the effect of the restoring spring of said radial arm attached to the additional arbor relative to an initial position of said radial arm.

6. The apparatus according to claim 5, further comprising
    bearings for the additional arbor, wherein the additional arbor is mounted to allow free rotation in its bearings.

7. The apparatus according to claim 6, wherein said control member is slidingly mounted on the stand and resting on said radial arm, wherein the push rod is actuated and engaged against the operation of the restoring spring by the movable member carrying the saw blade after the execution of the cutting operation.

8. The apparatus according to claim 5, further comprising
    a coupler, wherein the radial arm is coupled to the frame element by the coupler disengaged during the execution of the cutting operation, and engaged after the cutting operation.

9. The apparatus according to claim 1 further comprising
    an additional arbor;
    a support table for a section to be cut from an elongated piece, wherein at least one part of the said support table is mounted allowing rotation around a geometric axis, and wherein said geometric axis is parallel to an axis of the additional arbor supported parallel to said axis of said frame element in the bearings fixed to the stand, and wherein the member effects rotation of the additional arbor and the support table;

a control member disposed on the stand, wherein the movable member is functionally fastened to the control member in order to be moved by the movable member carrying the saw blade at the time of an end of a cutting course after execution of the cutting operation;

a cross bar 33 functionally fastened by means of the additional arbor (23) to the control member;

a restoring spring;

a radial arm (29) attached to the additional arbor, wherein the control member pushes against the radial arm (29) attached to the additional arbor to furnish a removing and clearing position for a section separated from the elongated piece against the effect of the restoring spring of said radial arm attached to the additional arbor relative to an initial position of said radial arm.

10. The apparatus according to claim 9, further comprising
bearings for the additional arbor, wherein the additional arbor is mounted to allow free rotation in its bearings.

11. The apparatus according to claim 10
wherein said control member is slidingly mounted on the stand and resting on said radial arm, wherein the push rod is actuated and engaged against the restoring spring by the movable member carrying the saw blade after the execution of the cutting operation.

12. The apparatus according to claim 9
wherein said control member is slidingly mounted on the stand and resting on said radial arm, wherein the push rod is actuated and engaged against the restoring spring by the movable member carrying the saw blade after the execution of the cutting operation.

13. An apparatus for removing a section cut from an elongated piece on a sawing machine comprising a stand (1), a vise (9) mounted on the stand (1) for holding an elongated piece, a movable member (4) diplaceably mounted on said stand (1) for performance of a cutting course in a transverse plane to the longitudinal axis of an elongated piece held in the vise (9), a saw blade (6) mounted on said movable member (4) and driven by a motor, a stop (10) movably mounted on a frame element (15) and position-controllable on said frame element (15) at an opposite side of the vise (9) relative to the saw blade (6), wherein bearings (17A, 17B) are attached to the stand (1) and hold said frame element (15) carrying the movable stop (10) for guiding said frame element (15) pivotingly around an axis perpendicular to said transverse plane, wherein kinematic connection means (19, 20) connect and tie the movable member (4) carrying the saw blade (6) to the frame element (15) carrying the stop (10), wherein said kinematic connection means (19, 20) generate the pivoting of said frame element (15) and of the stop (10) progressively starting with an initial position of said stop (10), during each cutting operation such that before the end of the operation the stop (10) is sufficiently removed from its initial position in order to be no longer in contact with any section being cut and to disengage the stop (10) from all contact with the section.

14. The apparatus according to claim 13, wherein
the kinematic connection means are of a mechanical type, and wherein the kinematic connection means is hinged on a first end with the movable member (4) carrying the saw blade (6) and on a second end with the frame element (15) carrying the stop (10).

15. The apparatus according to claim 14, wherein
a connecting rod (19) is hinged with the movable member (4) carrying the saw blade (6) by means of a rod (20) of an adjustable length, wherein the rod (20) of an adjustable length has a first end (20A) which is hinged to a first end of the connecting rod (19), wherein the rod (20) of an adjustable length has a second end (20B) by which it is fixed to a piece of the movable member (4), such that the movable member (4) is displaceable simultaneously with the rod (20) of an adjustable length.

16. The apparatus according to claim 13 further comprising a support table (8) for a section to be cut from an elongated piece, wherein at least one part of the said support table (8) is movably mounted allowing rotation around a geometric axis, and wherein said geometric axis is an axis of an additional arbor (23) supported parallel to said axis perpendicular to said transverse plane in bearings (24A, 24B) fixed to the stand (1), wherein the movable part is functionally fastened to a control member (26) disposed on the stand (1) in order to be actuated by the movable member (4) carrying the saw blade (6) at the end of a cutting course after execution of the cutting operation, wherein said control member (26) pushes against a radial arm (29) of the additional arbor for removal and clearing of a section separated from the elongated piece against the effect of a restoring spring (31) of said cross bar relative to an initial position of said radial arm.

17. The apparatus according to claim 16, wherein the totality of the support table (8) is movably mounted around the geometric axis of the additional arbor (23).

18. The apparatus according to claim 16, wherein
the radial arm (29) is fixed to said additional arbor (23), and wherein the additional arbor (23) is mounted to allow a free rotation in its bearings (24A, 24B).

19. The apparatus according to claim 18, wherein
the additional arbor (23) is furnished with a push rod (27) slidingly mounted on the stand (1) to rest on said radial arm (29), and wherein the push rod (27) is actuated and engaged against the effect of a spring (31) by the movable member (4) carrying the saw blade (6) after the execution of the cutting operation.

20. The apparatus according to claim 16, wherein the radial arm (29) is coupled to the frame element (15) by means of a coupler (34) disengaged during the execution of the cutting operation, and engaged after the cutting operation.

* * * * *